(12) United States Patent
Narita

(10) Patent No.: US 11,252,303 B2
(45) Date of Patent: Feb. 15, 2022

(54) RECORDING MEDIUM STORING PROGRAM OR PROGRAM GROUP FOR EXECUTING SCAN PROCESSING ON SCANNER AND INFORMATION PROCESSING APPARATUS CONFIGURED TO COMMUNICATE WITH SCANNER FOR EXECUTING SCAN PROCESSING ON SCANNER

(71) Applicant: BROTHER KOGYO KABUSHIKI KAISHA, Nagoya (JP)

(72) Inventor: Kenju Narita, Nagoya (JP)

(73) Assignee: BROTHER KOGYO KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 16/996,027

(22) Filed: Aug. 18, 2020

(65) Prior Publication Data

US 2021/0084196 A1 Mar. 18, 2021

(30) Foreign Application Priority Data

Sep. 17, 2019 (JP) .............................. JP2019-168383

(51) Int. Cl.
*G06F 3/08* (2006.01)
*H04N 1/60* (2006.01)
*H04N 1/333* (2006.01)

(52) U.S. Cl.
CPC ......... *H04N 1/603* (2013.01); *H04N 1/33376* (2013.01)

(58) Field of Classification Search
CPC .......................... H04N 1/603; H04N 1/33376

USPC .................................................. 358/474, 518
See application file for complete search history.

(56) References Cited

U.S. PATENT DOCUMENTS

2007/0248288 A1* 10/2007 Nagao ........................ G06T 1/20
382/303
2019/0289165 A1* 9/2019 Yoshimi .................. H04L 41/12

FOREIGN PATENT DOCUMENTS

JP 2014-093554 A 5/2015

* cited by examiner

*Primary Examiner* — Gabriel I Garcia
(74) *Attorney, Agent, or Firm* — Scully, Scott, Murphy & Presser, P.C.

(57) ABSTRACT

A non-transitory computer-readable recording medium stores computer-readable instructions, when executed by a processor of an information processing apparatus, causing the information processing apparatus to perform: receiving a parameter from a first other program different from the program; in response to receiving the parameter from the first other program, transmitting a scan execution command including the received parameter to a scanner through a communication interface of the information processing apparatus, the parameter being indicative of a setting value that is set for executing scan processing on the scanner; receiving mode selection information from a second other program different from the program and from the first other program; and in response to receiving the mode selection information from the second other program, converting the received mode selection information into a parameter, and transmitting a scan execution command including the converted parameter to the scanner through the communication interface.

20 Claims, 10 Drawing Sheets

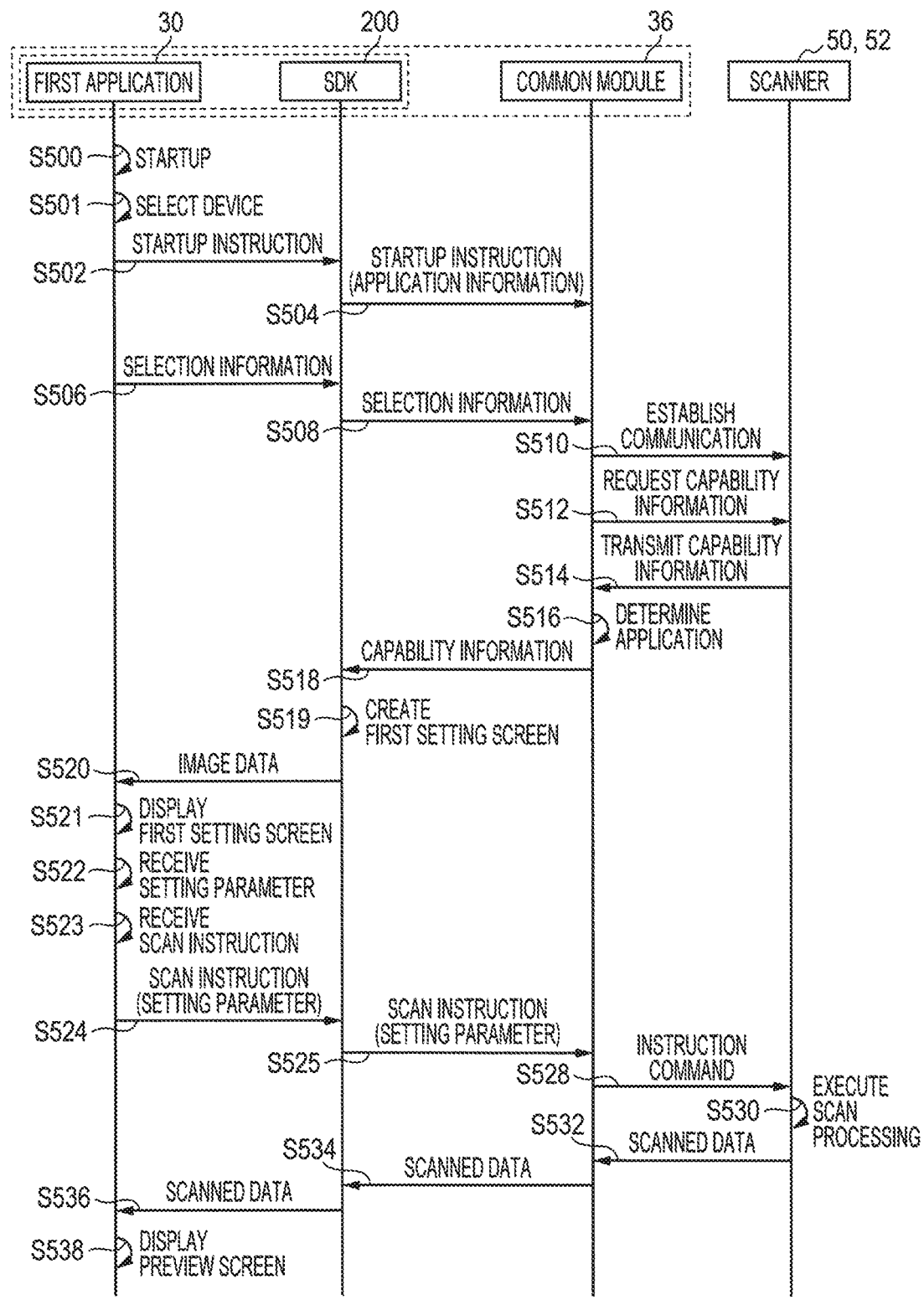

RECORDING MEDIUM STORING PROGRAM OR PROGRAM GROUP FOR EXECUTING SCAN PROCESSING ON SCANNER AND INFORMATION PROCESSING APPARATUS CONFIGURED TO COMMUNICATE WITH SCANNER FOR EXECUTING SCAN PROCESSING ON SCANNER

CROSS REFERENCE TO RELATED APPLICATIONS

This application claims priority from Japanese Patent Application No. 2019-168383 filed Sep. 17, 2019. The entire content of the priority application is incorporated herein by reference.

TECHNICAL FIELD

This disclosure relates to a recording medium storing a program executable on an information processing apparatus configured to communicate with a scanner, and an information processing apparatus.

BACKGROUND

In an information processing apparatus configured to communicate with a scanner, scan settings for performing scan processing are performed and scan processing is performed by a scanner in accordance with the performed scan settings.

SUMMARY

In view of the foregoing, an example of an objective of this disclosure is to appropriately perform scan processing in accordance with various scan settings.

According to one aspect, this specification discloses a non-transitory computer-readable recording medium storing a program including computer-readable instructions for an information processing apparatus. The computer-readable instructions, when executed by a processor of the information processing apparatus, cause the information processing apparatus to perform: receiving a parameter from a first other program different from the program; in response to receiving the parameter from the first other program, transmitting a scan execution command including the received parameter to a scanner through a communication interface of the information processing apparatus, the parameter being indicative of a setting value that is set for executing scan processing on the scanner; receiving mode selection information from a second other program different from the program and from the first other program, the mode selection information being indicative of a mode that is selected from among a plurality of modes for executing scan processing; and in response to receiving the mode selection information from the second other program, converting the received mode selection information into a parameter, and transmitting a scan execution command including the converted parameter to the scanner through the communication interface.

According to another aspect, this specification also discloses a non-transitory computer-readable recording medium storing a program group including a common program, a first other program different from the common program, and a second other program different from the common program and from the first other program. The program group includes computer-readable instructions for an information processing apparatus. The computer-readable instructions, when executed by a processor of the information processing apparatus, cause the information processing apparatus to perform: outputting a parameter from the first other program to the common program, the parameter being indicative of a setting value that is set for executing scan processing; outputting mode selection information from the second other program to the common program, the mode selection information being indicative of a mode that is selected from among a plurality of modes for executing scan processing; in response to outputting the parameter from the first other program to the common program, transmitting a scan execution command including the parameter from the common program to a scanner through a communication interface of the information processing apparatus; and in response to outputting the mode selection information from the second other program to the common program, converting, by the common program, the mode selection information into a parameter and transmitting a scan execution command including the converted parameter to the scanner through the communication interface.

According to still another aspect, this specification also discloses an information processing apparatus. The information processing apparatus includes a communication interface, an input interface, and a control device. The control device is configured to: receive input of a parameter through the input interface, the parameter being indicative of a setting value that is set for executing scan processing; receive input of mode selection information through the input interface, the mode selection information being indicative of a mode that is selected from among a plurality of modes for executing scan processing; in response to receiving the parameter, transmit a scan execution command including the received parameter to a scanner through the communication interface; and in response to receiving the mode selection information, convert the mode selection information into a parameter and transmit a scan execution command including the converted parameter to the scanner through the communication interface.

BRIEF DESCRIPTION OF THE DRAWINGS

Embodiments in accordance with this disclosure will be described in detail with reference to the following figures wherein:

FIG. 11 shows an operational sequence of the scan system 1 according to a third embodiment.

DETAILED DESCRIPTION

First Embodiment

Figure 1:
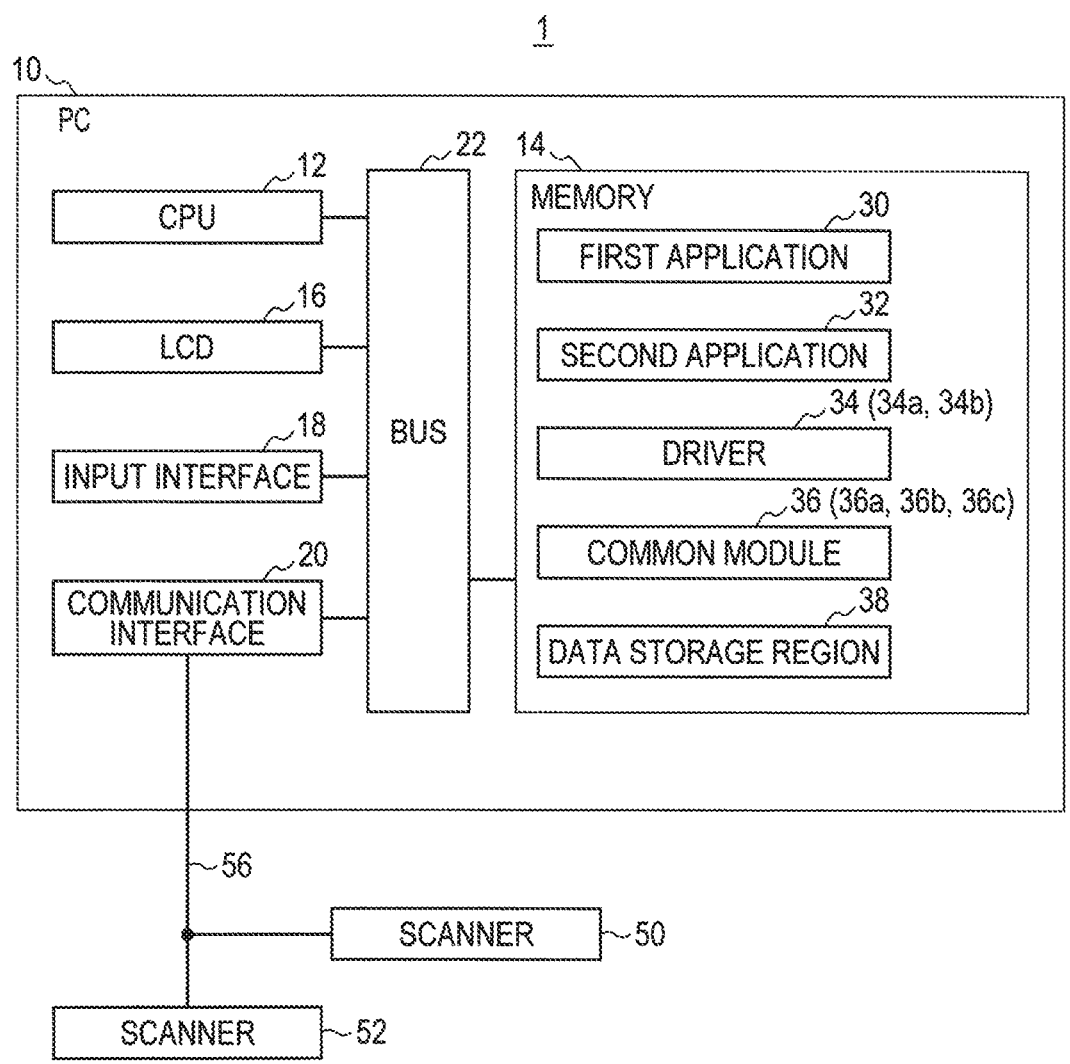
FIG. 1 is a block diagram showing a scan system 1.

A scan system 1 shown in FIG. 1 includes a PC (one example of an information processing apparatus) 10 and two scanners 50, 52. The PC 10 mainly includes a CPU (one example of a processor and a control device) 12, a memory 14, an LCD (one example of a display) 16, an input interface 18, and a communication interface (one example of a communication interface) 20. These elements are configured to communicate with one another through a bus 22.

The PC 10 and the scanners 50, 52 are configured to communicate with each other through the communication interface 20 and a communication path 56. As the method of communication, for example, wired LAN, USB, Wi-Fi™, or Bluetooth™ may be adopted.

The CPU 12 executes processing in accordance with a first application (one example of a third other program and a program group) 30, a second application (one example of a second other program and a program group) 32, drivers (one example of a first other program and a program group) 34a, 34b, and a common module (one example of a program, a common program and a program group) 36 in the memory 14. In the following description, the CPU 12 executing the first application 30 and so on may be called simply by a program name. For example, the phrase "the first application 30" may mean "the CPU 12 executing the first application 30".

Figure 2A:
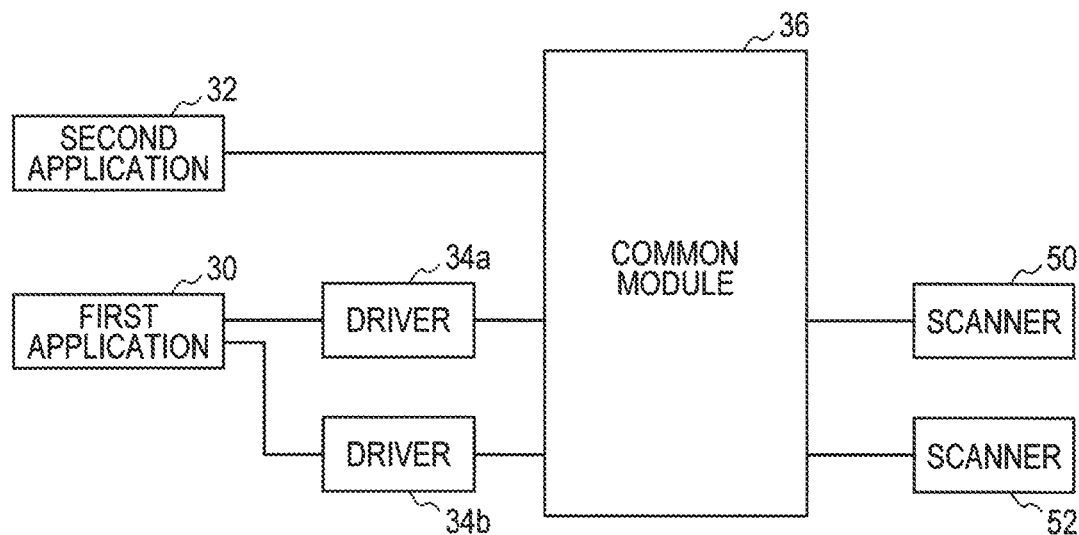
FIG. 2A is a block diagram schematically showing relationships among a first application 30, a second application 32, drivers 34*a* and 34*b*, a common module 36, a scanner 50, and a scanner 52 according to a first embodiment.
Figure 2B:
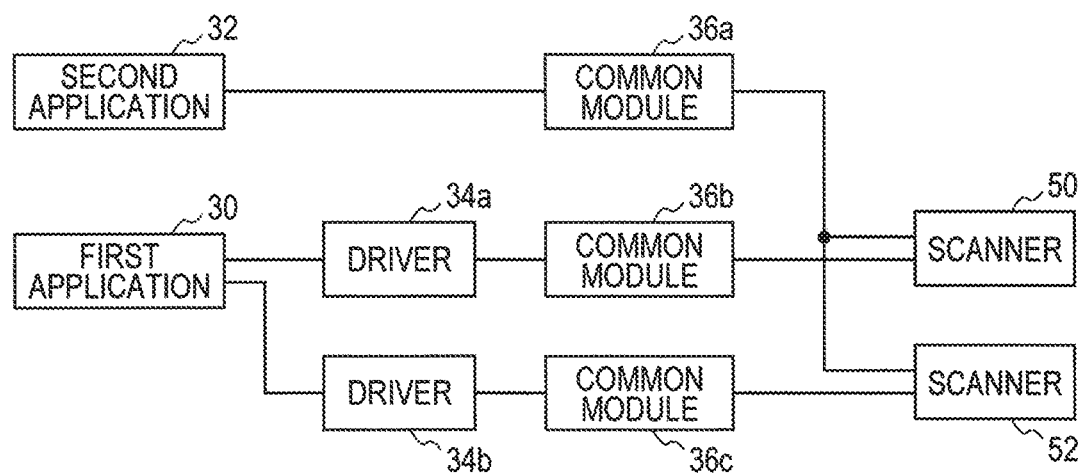
FIG. 2B is a block diagram schematically showing relationships among the first application 30, the second application 32, the drivers 34*a* and 34*b*, common modules 36*a*, 36*b*, and 36*c*, the scanner 50, and the scanner 52 according to a modification.

The first application 30 is an application program for performing scan processing with detailed scan settings. The second application 32 is an application program for performing scan processing with simplified scan settings. The drivers 34a, 34b are device drivers of the scanners 50, 52, and control the operations of the scanners 50, 52 in accordance with the processing of the first application 30. As shown in FIGS. 2A and 2B, the driver 34a corresponds to the scanner 50, and the driver 34b corresponds to the scanner 52.

The common module 36 is a program for transmitting an instruction command for instructing execution of scan processing to the scanners 50, 52. In response to a scan instruction from the second application 32 and the drivers 34a, 34b, the common module 36 transmits an instruction command to the scanner 50. That is, in a case where scan processing is executed by using the second application 32, the second application 32 outputs a scan instruction to the common module 36, thereby the common module 36 transmits an instruction command to the scanner 50 or the scanner 52, and scan processing is executed by the scanner 50 or the scanner 52. In a case where scan processing is executed by using the first application 30, the driver 34a operating in accordance with the processing of the first application 30 outputs a scan instruction to the common module 36, thereby the common module 36 transmits an instruction command to the scanner 50, and scan processing is executed by the scanner 50. Further, the driver 34b operating in accordance with the processing of the first application 30 outputs a scan instruction to the common module 36, thereby the common module 36 transmits an instruction command to the scanner 52, and scan processing is executed by the scanner 52. In a modification, as shown in FIG. 2B, a common module (one example of a second common program) 36a may correspond to the second application 32, a common module (one example of a first common program) 36b may correspond to the driver 34a, and a common module (one example of the first common program) 36c may correspond to the driver 34b.

As shown in FIG. 1, the memory 14 has a data storage region 38. The data storage region 38 is an area for storing data necessary for executing programs and so on. The memory 14 is a combination of a RAM, a ROM, a flash memory, an HDD, and a buffer provided in the CPU 12.

The memory 14 may be a computer-readable recording medium. The computer-readable recording medium means a non-transitory medium; apart from the above-described examples, the non-transitory medium includes a CD-ROM and a DVD-ROM. The non-transitory medium is also a tangible medium. On the other hand, an electrical signal transmitting a program downloaded from a server or the like on the Internet is also a computer-readable signal medium as a type of computer-readable medium, however it is not included in the non-transitory computer readable recording medium.

The LCD 16 displays various function of the PC 10. The input interface 18 includes a keyboard, a mouse, and so on, and is an interface for receiving an operational input. Hereinafter, the operation through the input interface 18 is also referred to as "user operation".

In the scan system 1, by using the first application 30 and the common module 36, scan processing can be performed with detailed scan settings. Specifically, in the processing by the first application 30, a setting item indicative of a color tone of scan setting during execution of scan processing, for example, parameters such as "Brightness" and "Contrast" can be set to an arbitrary parameter (parameters are numerical values). And, when the set arbitrary parameter (hereinafter referred to as "setting parameter") is outputted to the common module 36, the common module 36 transmits the instruction command including the setting parameter to the scanner 50, 52. With this operation, in the scanner 50, 52, scan processing based on the setting parameter is executed.

On the other hand, by using the second application 32 and the common module 36, scan processing can be performed with simplified scan setting. Specifically, in the processing by the second application 32, the mode can be set to either one of a photograph (photo) mode for setting scan processing for photographs and a document mode for setting scan processing for written documents such as texts. And, when the set mode (hereinafter referred to as "setting mode") is outputted to the common module 36, the common module 36 converts the setting mode into a parameter corresponding to the setting mode, and transmits an instruction command including the converted parameter to the scanner 50, 52. With this operation, in the scanner 50, 52, scan processing based on the parameter corresponding to the setting mode is executed. The operations of the scan system 1 at this time will be described in greater detail while referring to the sequence charts shown in FIGS. 3 and 4.

In this specification, basically, the processing of the CPU 12 in accordance with instructions described in the application 37 will be described. That is, the processing such as "judgment", "extraction", "selection", "calculation", "determination", "identification", "acquisition", "reception", "control", and "setting" in the following descriptions indicates processing by the CPU 12. The processing by the CPU 12 includes hardware control through a controller by the OS 36 and so on. The "acquisition" does not need requesting. That is, the idea that "the CPU 12 acquires data" includes processing that the CPU 12 receives data without requesting. Further, "data" in this specification is expressed by a bit array that is readable by a computer. A plurality of data having substantially the same meaning but having different formats is treated as the same data. The same goes for "information" in this specification. The processing such as "instruction", "response", and "request" is executed by communicating information indicative of "instruction", "response", and "request". Further, language such as "instruction", "response", and "request" may be described as information itself indicative of "instruction", "response", and "request". The processing, by the CPU, of determining whether information A indicates matter B may be conceptually described as "determining whether it is matter B based on information A". The processing, by the CPU, of determining whether information A indicates matter B or indicates matter C may be conceptually described as "determining whether it is matter B or matter C based on information A".

The operation of the scan system 1 in a case where scan processing is executed by using the first application 30 will be described, with reference to the sequence chart shown in FIG. 3. When the first application 30 is started up according to a user operation (S100), the first application 30 displays a selection screen for selecting a scanner that executes scan processing on the LCD 16 and receives a device (hereinafter referred to as a "selected device") selected by the user operation on the selection screen (S101). The first application 30 outputs a startup instruction to the driver 34 corresponding to the selected device (S102). In this way, the driver 34 corresponding to the selected device is started up and the driver 34 outputs a startup instruction to the common module 36 (S104). In a modification, the driver 34 may output a startup instruction to the common module 36b or 36c corresponding to the driver 34 (that is, the common module 36b or 36c corresponding to the selected device). In this way, the common module 36b or 36c corresponding to the selected device is started up. The driver 34 corresponding to the selected device outputs, as application information, self information indicative of itself (that is, information indicative of the driver 34) to the common module 36 together with the startup instruction.

The first application 30 outputs information (hereinafter referred to as "selection information") indicative of the selected device to the driver 34 corresponding to the selected device (S106), and in response to receiving the selection information, the driver 34 outputs the selection information to the common module 36 (S108). In this way, the common module 36 establishes communication with the scanner 50 or 52 (that is, the selected device) indicated by the selection information (S110). The common module 36 transmits a request for capability information to the selected device with which communication has been established (S112), and the selected device transmits the capability information to the common module 36 according to the request (S114). The capability information is information indicative of a capability value and is information indicative of a range of setting values of setting items indicative of the resolution of a selected device, a document size readable by the selected device, and a color tone of scan setting that can be processed by the selected device.

The scanner 50 is a device configured to change two setting items of "Brightness" and "Contrast" as the setting items of scan setting into arbitrary setting values and to execute scan processing. In a case where the scanner 50 is selected as the selected device, the scanner 50 transmits, to the common module 36, the upper and lower limits of changeable setting value for each setting item of "Brightness" and "Contrast" as capability information. The scanner 52 is a device configured to change four setting items of "Brightness", "Contrast", "Shadow", and "Gamma" as the setting items of scan setting into arbitrary setting values and to execute scan processing. In a case where the scanner 52 is selected as the selected device, the scanner 52 transmits, to the common module 36, the upper and lower limits of changeable setting value for each setting item of "Brightness", "Contrast", "Shadow", and "Gamma" as capability information.

The common module 36 having received the capability information of the selected device determines the application program of the output target based on the application information (S116). That is, the common module 36 determines an application program indicated by the application information received together with the startup information in S104. In this case, as described above, since the common module 36 has received information indicative of the driver 34 corresponding to the selected device as the application information, the common module 36 determines that the driver 34 corresponding to the selected device is the application program of the output target. When the driver 34 is the application program of the output target, the common module 36 is programmed such that capability information is outputted to the driver 34. Therefore, the common module 36 outputs the capability information to the driver 34 corresponding to the selected device (S118).

Figure 5:
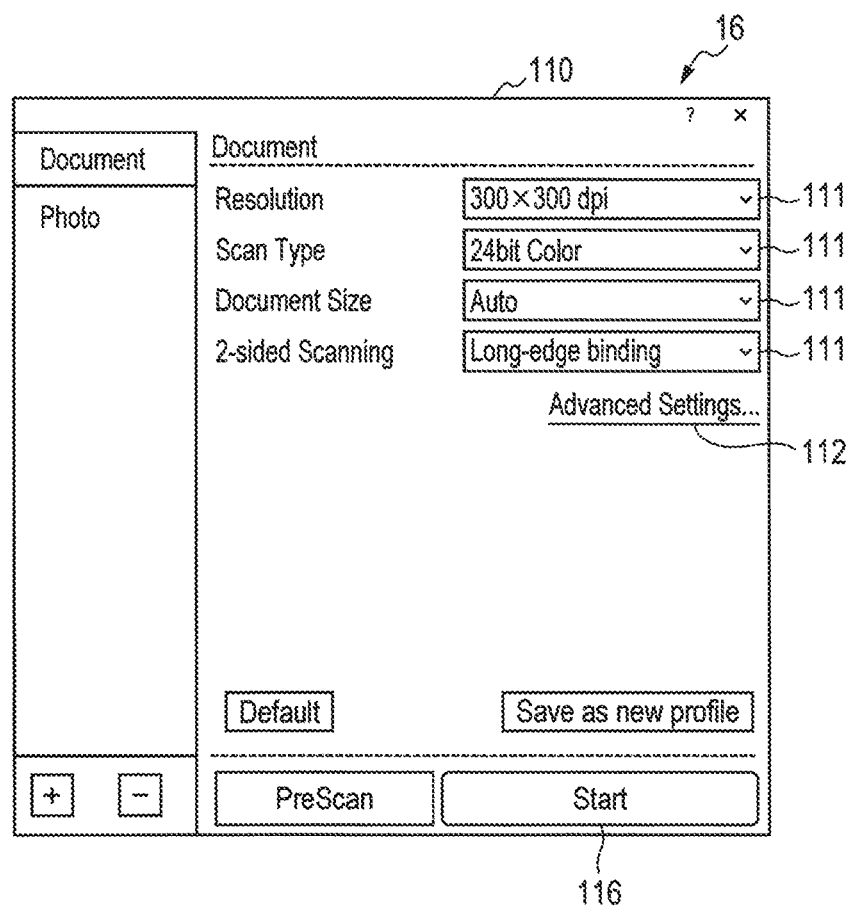
FIG. 5 shows a first setting screen 110.
Figure 6:
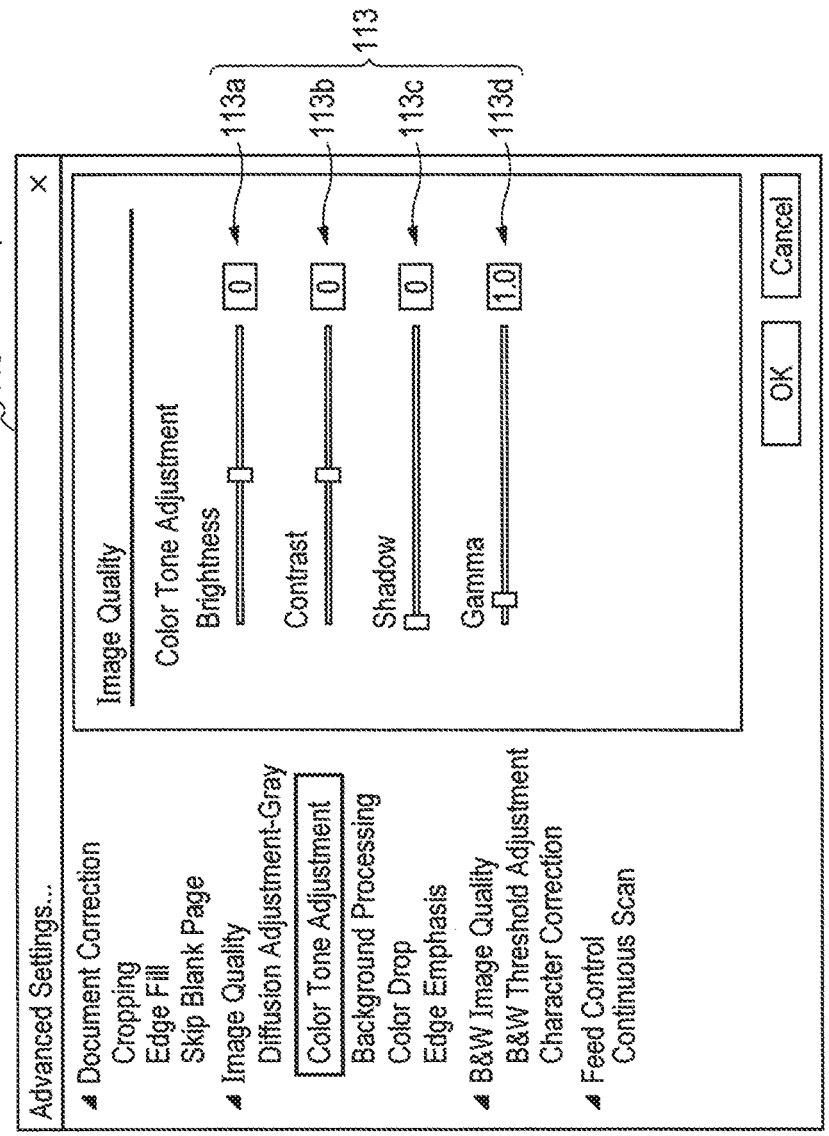
FIG. 6 shows another screen of the first setting screen 110.

The driver 34 corresponding to the selected device creates a first setting screen (see FIGS. 5 and 6) (an example of a setting screen) 110 based on the capability information and displays the first setting screen 110 on the LCD 16 (S120). Specifically, as described above, the capability information includes the resolution of a selected device, a document size readable by the selected device, and so on. Therefore, as shown in FIG. 5, various setting buttons 111 for setting the resolution of the selected device, a document size readable by the selected device, and so on included in the capability information are displayed on the first setting screen 110. In the various setting buttons 111, an arbitrary option can be selected from a plurality of options of the resolution of scan processing executable by the selected device and the readable document size. A parameter setting button 112 is also displayed on the first setting screen 110. When the parameter setting button 112 is operated, the display content of the first setting screen 110 is switched as shown in FIG. 6. Slider bars 113 (an example of a first object) for setting arbitrary setting values between the upper and lower limits of each of a plurality of setting items are displayed in the switched first setting screen 110. The capability information includes information indicative of the upper and lower limits of a setting value changeable in the selected device for each of a plurality of setting items indicative of color tone in scan settings in addition to the resolution of scan processing, a readable document size, and so on. Therefore, the slider bars 113 for selling arbitrary setting values between the upper and lower limits for each of a plurality of setting items included in the capability information is displayed in the first setting screen 110 shown in FIG. 6. As described above, in the scanner 52, four setting items indicative of color tone of "Brightness", "Contrast", "Shadow", and "Gamma" can be changed to arbitrary setting values. Therefore, when the scanner 52 is selected as the selected device, since these four setting items are included in the capability information, as shown in FIG. 6, a slider bar 113*a* for setting "Brightness", a slider bar 113*b* for setting "Contrast", a slider bar 113*c* for setting "Shadow", and a slider bar 113*d* for setting "Gamma" are displayed in the first setting screen 110.

When a setting value is set for each setting item indicative of the color tone by a user operation in the first setting screen 110, the driver 34 corresponding to the selected device receives the setting values as setting parameters (S122). When an arbitrary option is selected from a plurality of options according to an operation on the various setting buttons 111 in the first setting screen 110 shown in FIG. 5 as scan setting other than the setting parameters indicative of a color tone, the driver 34 also receives the selected option. That is, a setting parameter indicative of a color tone is set in the first setting screen 110 shown in FIG. 6, and options other than the color tone among the plurality of options is set in the first setting screen 110 shown in FIG. 5. When the scan button 116 displayed in the first setting screen 110 is operated, the driver 34 corresponding to the selected device receives a scan instruction (S124) and outputs a scan instruction including a setting parameter indicative of the color tone and options other than the color tone to the common module 36 (S126). In response to receiving the scan instruction, the common module 36 extracts the setting parameter indicative of a color tone and options other than the color tone included in the scan instruction and transmits an instruction command including the setting parameter indicative of the color tone and the options other than the color tone to the selected device (S128).

In this way, scan processing corresponding to the setting parameter indicative of the color tone and the options other than the color tone is executed in the selected device (S130). Scanned data created by the scan processing is transmitted to the common module 36 (S132), and the common module 36 outputs the scanned data to the driver 34 corresponding to the selected device (S134). The driver 34 outputs the scanned data to the first application 30 (S136), and the first application 30 displays an image based on the scanned data on a preview screen (S138). In this way, the use of the first application 30 enables users to set an arbitrary setting value for each setting item of the scan settings and to perform scan processing according to detailed scan settings.

The operations of the scan system 1 in a case where scan processing is executed by using the second application 32 will be described in greater detail while referring to the sequence chart shown in FIG. 4. When the second application 32 is started up by a user operation (S200), in a similar manner to the first application 30, the second application 32 displays a selection screen on the LCD 16 and receives the selected device through a user operation on the selection screen (S201). Then, the second application 32 outputs a startup instruction to the common module 36 (S202). With this operation, the common module 36 is started up. Note that the second application 32 outputs, to the common module 36, self information, that is, information indicative of the second application 32 as application information, together with the startup instruction.

The second application 32 outputs information indicative of the selected device, that is, the selection information to the common module 36 (S206). With this operation, the common module 36 establishes communication with the scanner 50, 52 indicated by the selection information, that is, the selected device (S208). Then, the common module 36 transmits a request for capability information to the selected device with which communication has been established (S210), and the selected device transmits the capability information to the common module 36 in response to that request (S212).

The common module 36 having received the capability information of the selected device determines the application program of the output target based on the application information (S214). That is, the common module 36 determines which application program is indicated by the application information received together with the startup information in S202. At this time, as described above, the common module 36 has received the information indicative of the second application 32 as the application information, and thus determines that the application program of the output target is the second application 32. All the common module 36 is programmed, in a case where the application program of the output target is the second application 32, to output mode information and capability information to the second application 32. Hence, in response to receiving the capability information from the selected device, the common module 36 outputs the mode information and the capability information to the second application 32 (S216).

Figure 7:
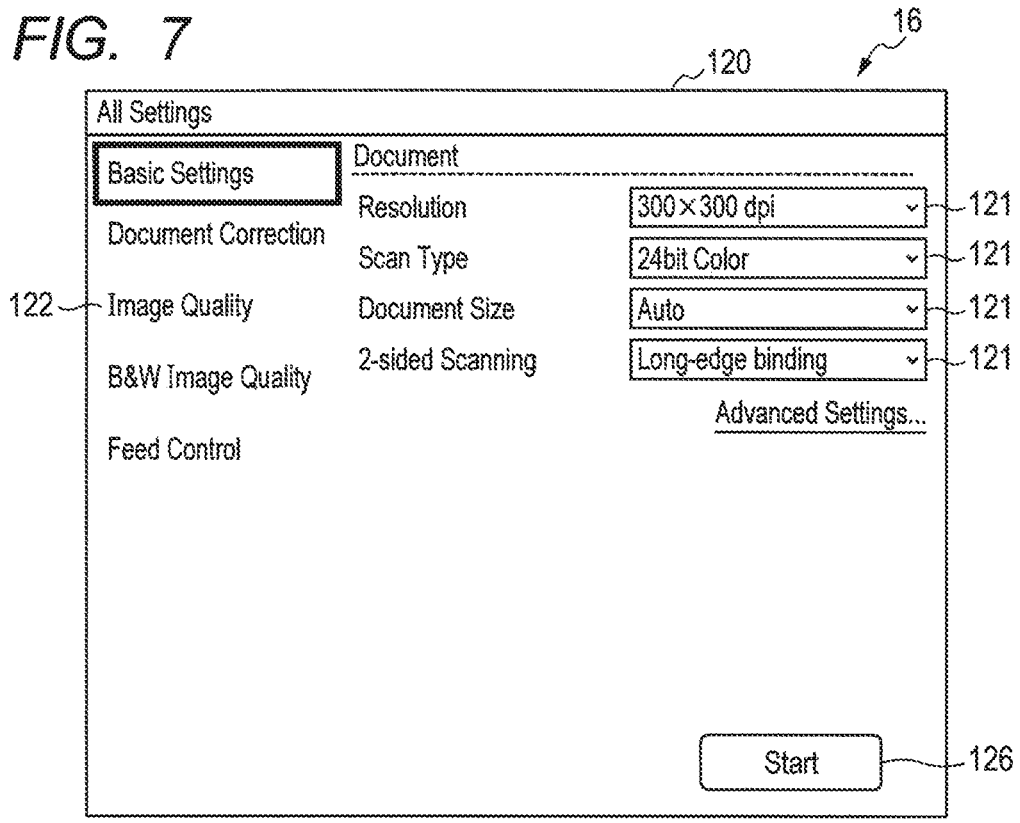
FIG. 7 shows a second setting screen 120.
Figure 8:
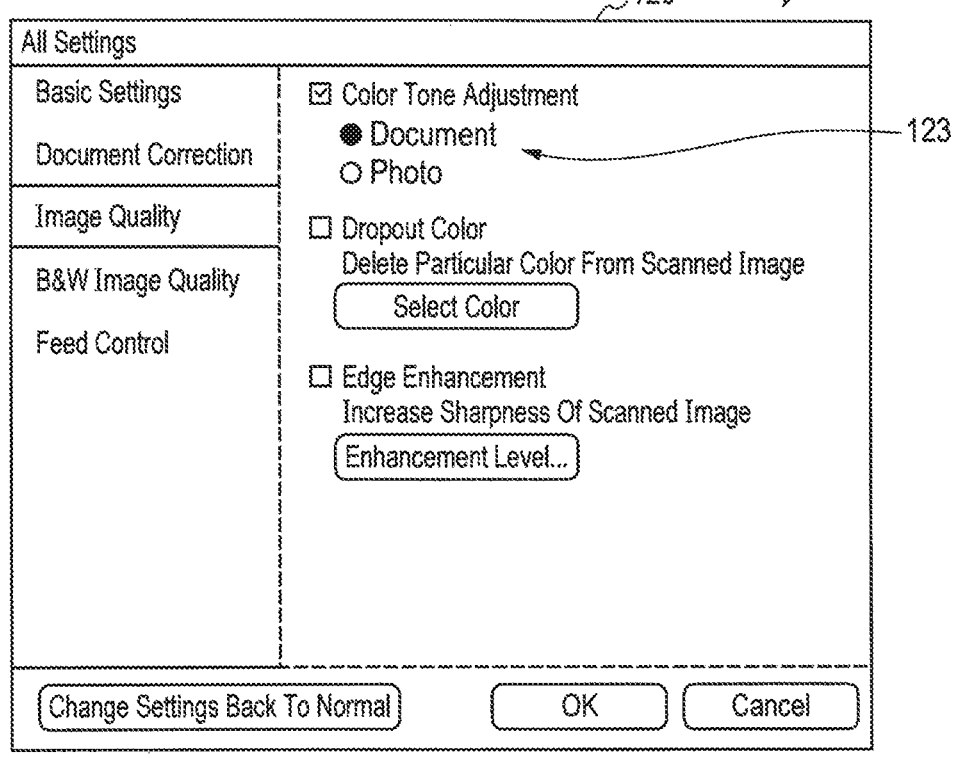
FIG. 8 shows another screen of the second setting screen 120.

The mode information is information indicative of options of the two modes of a photograph mode for setting color tone of scan processing of photographs and a document mode for setting color tone of scan processing of documents. The mode information is information for roughly setting the color tone of scan setting without including the setting value (numerical value) and so on of each setting item indicative of the color tone of the scan setting unlike the capability information. In other words, each mode collectively identifies parameters of the plurality of setting items. That is, each mode is associated with parameters of the plurality of setting items. In response to receiving the capability information and the mode information, the second application 32 creates a second setting screen (see FIGS. 7 and 8) 120 based on the capability information and the mode information and displays the second setting screen 120 on the LCD 16 (S218). Specifically, the second application 32 displays the second setting screen 120 on the LCD 16 as shown in FIG. 7 based on the resolution of a selected device, the document size readable by the selected device, and so on included in the capability information similarly to the first setting screen 110. Various setting buttons 121 for setting a resolution, a document size, and so on are also displayed in the second setting screen 120 similarly to the first setting screen 110. A mode setting button 122 is also displayed in the second setting screen 120. When the mode setting button 122 is operated, the display content of the second setting screen 120 is switched as shown in FIG. 8 based on the mode information. That is, as described above, the mode information is information indicative of options of the two modes of a photograph mode for setting a color tone of scan processing of a photograph color tone and a document mode for setting a color tone of scan processing of a document color tone. Therefore, a radio button 123 (an example of a second object) for selecting either one of the two modes of a photograph mode for setting a color tone of scan processing of a photograph color tone and a document mode for setting a color tone of scan processing of a document color tone is displayed in the second setting screen 120 shown in FIG. 8.

When one mode is set from the options of the photograph mode and the document mode according to a user operation on the radio button 123 in the second setting screen 120, the second application 32 receives the set mode as the setting mode indicative of the color tone (S220). When an arbitrary one of a plurality of options is selected according to an operation on the various setting buttons 121 in the second setting screen 120 shown in FIG. 7 as scan settings other than the setting mode indicative of a color tone, the second application 32 also receives the selected one option. That is, a setting mode indicative of the color tone is set in the second setting screen 120 shown in FIG. 8, and an option other than the color tone among a plurality of options other than the color tone is set in the second setting screen 120 shown in FIG. 7. When a scan button 126 displayed on the second setting screen 120 is operated, the second application 32 receives a scan instruction (S222) and outputs a scan instruction including a setting mode (mode selection information) indicative of the color tone and options other than the color tone to the common module 36 (S224).

In response to receiving a scan instruction, the common module 36 converts the setting mode included in the scan instruction into a parameter for each of setting items set preliminarily according to the setting mode (S225). Specifically, a setting parameter for each of setting items relating to color tone in a scan setting is set preliminarily for each of the photograph mode and the document mode. The setting parameter corresponding to each mode is set for each capability value of the selected device (that is, depending on the capability value of the scanner). That is, in a case where the selected device is the scanner 50, since scan processing can be executed by arbitrarily changing the setting values of the two setting items of "Brightness" and "Contrast", the setting parameters of the two setting items are preliminarily set for each of the photograph mode and the document mode. When the selected device is the scanner 52, since the scan processing can be executed by arbitrarily changing the setting values of the four setting items of "Brightness", "Contrast", "Shadow", and "Gamma", the setting parameters of the four setting items are preliminarily set for each of the photograph mode and the document mode.

Therefore, for example, for the photograph mode, setting parameters (A1, B1) of the two setting items of "Brightness" and "Contrast" and setting parameters (A2, B2, C2, D2) of the four setting items of "Brightness", "Contrast", "Shadow", and "Gamma" are set preliminarily. Moreover, for the document mode, setting parameters (A3, B3) of the two setting items of "Brightness" and "Contrast" and setting parameters (A4, B4, C4, D4) of the four setting items of "Brightness". "Contrast", "Shadow", and "Gamma" are set preliminarily. And, the setting mode is converted into the preliminarily-set setting parameter based on the setting mode and the capability value (that is, capability information) of the selected device. For example, when the photograph mode is set as a setting mode and the selected device is the scanner 50, since the capability information of the scanner 50 includes the upper and lower limits of the setting value of the two setting items, the setting mode is converted into the setting parameters (A1, B1) of the two setting items. For example, when the document mode is set as a setting mode and the selected device is the scanner 52, since the capability information of the scanner 52 includes the upper and lower limits of the setting value of the four setting items, the setting mode is converted into the setting parameters (A4, B4, C4, D4) of the four setting items.

When the setting mode indicative of the color tone is converted into the setting parameter, the common module 36 transmits an instruction command including the converted setting parameter and options other than the color tone to the selected device (S226). In this way, scan processing corresponding to the setting parameter set according to the setting mode indicative of the color tone and options other than the color tone is executed in the selected device (S228). Subsequently, the scanned data created by the scan processing is transmitted to the common module 36 (S230), and the common module 36 outputs the scanned data to the second application 32 (S232). The second application 32 displays an image based on the scanned data on a preview screen (S234). In this way, the use of the second application 32 enables users to execute scan processing by selecting one option from the two options of a photograph mode and a document mode without setting the setting values for respective setting items of the scan settings. That is, scan processing can be performed with simplified scan setting.

Second Embodiment

In the first embodiment, the common module 36 determines the application program of the output target based on the application information and outputs at least one of the capability information or the mode information to the determined application program of the output target. In a second embodiment shown in FIGS. 9 and 10, the common module 36 outputs two kinds of information of the capability information and the mode information to the application program of the output target.

More specifically, the common module 36 is configured to, in response to receiving the selection information (S108, S206), return at least the capability information to the program (the request source) that has sent the selection information (S118, S216). In other words, if requested by the driver 34, the common module 36 returns the information to the driver 34, and if requested by the second application 32, the common module 36 returns the information to the second application 32. Because the common module 36 returns the information to the request source, it is unnecessary to perform the application determination for the purpose of returning the information to the request source. In the first embodiment, the common module 36 returns the capability information to the driver 34, and returns the mode information and the capability information to the second application 32. Thus, it is necessary to perform the application determination in order to determine which information is to be returned to the request source. In the second embodiment, the common module 36 returns the capability information and the mode information to the driver 34 and to the second application 32. Thus, it is unnecessary to perform the application determination in order to determine which information is to be returned to the request source.

The operation of the scan system 1 in the second embodiment will be described in detail while referring to FIG. 9. First, the operation of the scan system 1 when scan processing is executed by using the first application 30 will be described. The processing after the first application 30 is started up and until the common module 36 receives the capability information from the selected device is the same as the processing of S100 to S114 (see FIG. 3) of the first embodiment. Therefore, the description of the processing will be omitted and the processing after the common module 36 receives the capability information from the selected device will be described.

Figure 9:
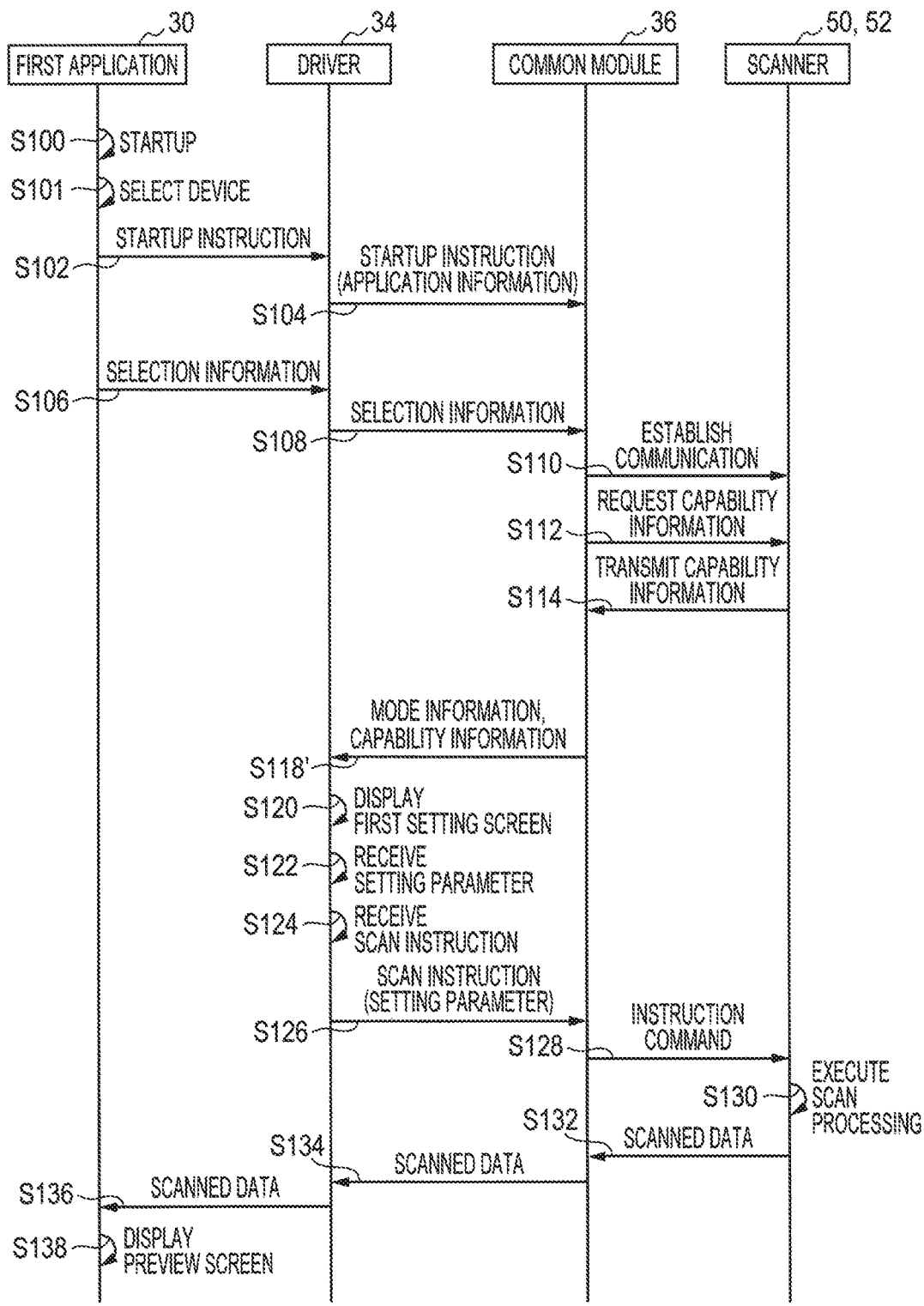
FIG. 9 shows an operational sequence of the scan system 1 according to a second embodiment in a case where scan processing is executed by using the first application 30.

In the second embodiment, as shown in FIG. 9, in response to receiving the capability information from the selected device, the common module 36 outputs both the mode information and the capability information to the driver 34 corresponding to the selected device (S118'), without performing an application determination based on the application information. The driver 34 is programmed to create the first setting screen 110 (see FIGS. 5 and 6) based on the received capability information even when the mode information and the capability information are transmitted from the common module 36. Therefore, in response to receiving the mode information and the capability information from the common module 36, the driver 34 creates the first setting screen 110 based on the capability information and displays the first setting screen 110 on the LCD 16. In this way, by outputting the mode information and the capability information to the driver 34 from the common module 36, the first setting screen 110 for setting parameters for respective setting items of the scan setting can be displayed. When the first setting screen 110 is displayed, the driver 34 receives setting parameters according to the user operation on the first setting screen 110, The processing after the driver 34 receives the setting parameters is the same as the processing of S122 to S138 (see FIG. 3) of the first embodiment. Therefore, the description of the processing will be omitted.

The operation of the scan system 1 when executing scan processing by using the second application 32 will be described while referring to FIG. 10. The processing after the second application 32 starts up and until the common module 36 receives the capability information from the selected device is the same as the processing in S200 to S212 (see FIG. 4) of the first embodiment. Thus, the descriptions of those processing will be omitted, and the processing after the common module 36 receives the capability information from the selected device will be described.

Figure 10:
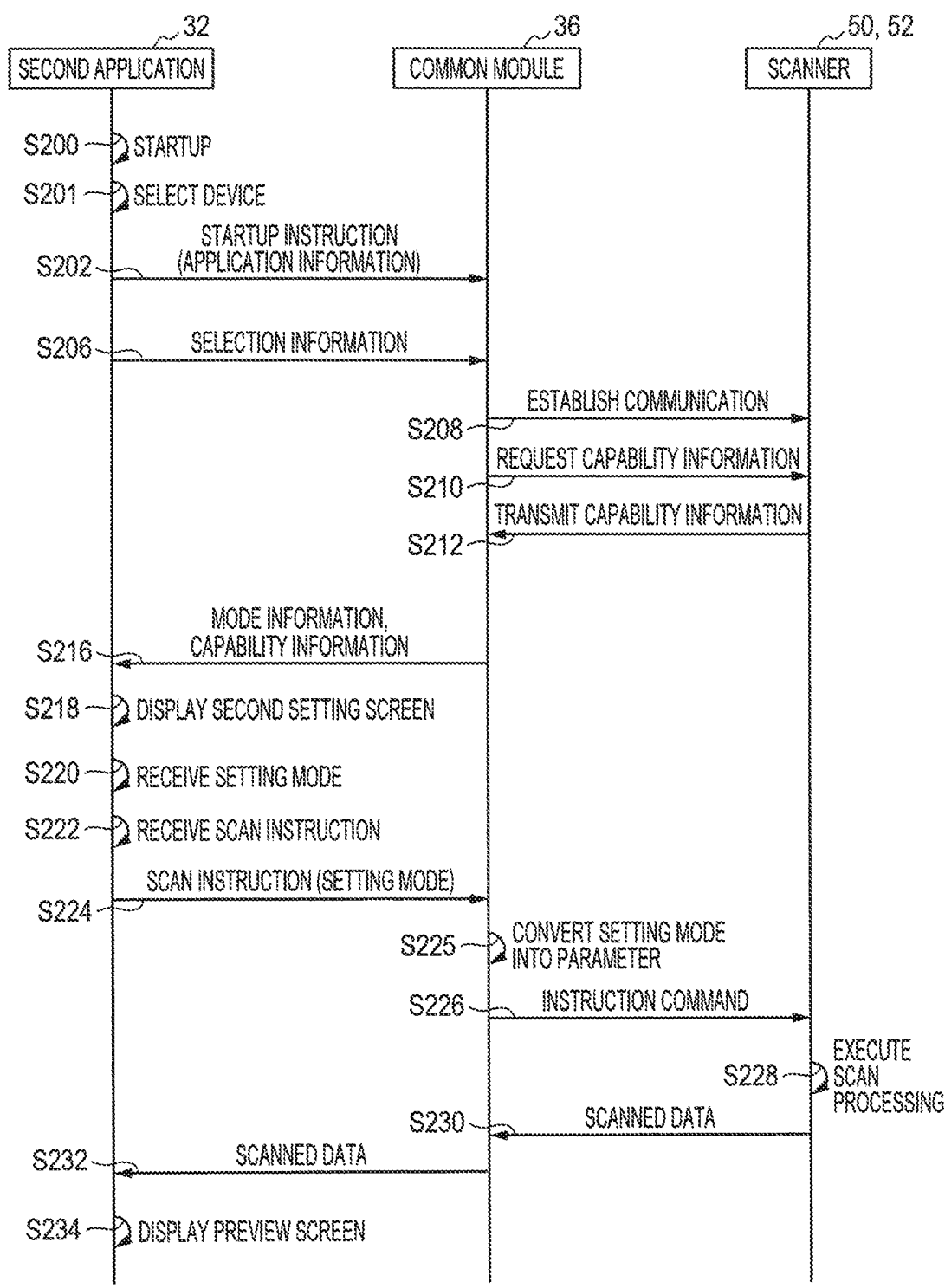
FIG. 10 shows an operational sequence of the scan system 1 according to the second embodiment in a case where scan processing is executed by using the second application 32.

As shown in FIG. 10, in response to receiving the capability information from the selected device, the common module 36 outputs both the mode information and the capability information to the second application 32 (S216), without performing application determination based on the application information. The second application 32 is programmed to, in response to receiving the mode information and the capability information, create a second setting screen (see FIGS. 7 and 8) 120 based on the mode information and the capability information. Hence, in response to receiving the mode information and the capability information from the common module 36, the second application 32 creates the second setting screen 120 based on the mode information and the capability information, and displays the second setting screen 120 on the LCD 16. In this way, by outputting the mode information and the capability information to the second application 32 by the common module 36, too, the second setting screen 120 for performing simplified scan settings can be displayed. When the second setting screen 120 is displayed, the second application 32 receives a setting mode through a user operation on the second setting screen 120. The processing after the second application 32 receives the setting mode is the same as the processing in S220 to S234 (see FIG. 4) of the first embodiment. Thus, the descriptions of those processing will be omitted.

Third Embodiment

In the first embodiment, the first application 30 communicates with the common module 36 through the driver 34. In a third embodiment, the first application 30 communicates with the common module 36 through an SDK (Software Development Kit) (see FIG. 11) (an example of a first other program and a program group) 200 instead of the driver 34. Therefore, the operation of the scan system 1 when executing scan processing using the first application 30 in the third embodiment will be described in detail by using the sequence chart shown in FIG. 11.

The processing after the first application 30 is started up and until the common module 36 determines an application based on the application information (that is, the processing of S540 to S516) is the same as the processing of the first embodiment except that the SDK 200 executes the processing of the driver 34 in the processing of S100 to S116 (see FIG. 3) of the first embodiment. Therefore, the description of the processing will be omitted and the processing after the common module 36 performs an application determination based on the application information will be described.

When the common module 36 performs an application determination based on the application information (S516), the common module 36 determines that the application program of the output target is the SDK 200. Thus, the common module 36 outputs the capability information to the SDK 200 (S518). In response to receiving the capability information, the SDK 200 creates the first setting screen (see FIG. 5) 110 based on the capability information (S519) and outputs the image data of the created first setting screen 110 to the first application 30 (S520). The first application 30 having received the image data displays the first setting screen 110 on the LCD 16 based on the image data (S521).

In the first setting screen 110, when a setting value is set for each setting item through a user operation, the first application 30 receives the set setting value as a setting parameter (S522). Then, when the scan button 116 is operated in the first setting screen 110, the first application 30 receives a scan instruction (S523). At this time, the first application 30 outputs a scan instruction including the setting parameter to the SDK 200 (S524). In response to receiving the scan instruction, the SDK 200 outputs the scan instruction to the common module 36 (S525). In response to receiving the scan instruction, the common module 36 extracts the setting parameter included in the scan instruction, and transmits an instruction command including the setting parameter to the selected device (S528).

Then, the selected device executes scan processing in accordance with the setting parameter (S530). In this way, by using the SDK 200 instead of the driver 34, the first setting screen 110 for setting the parameter of each setting item of scan setting is displayed, and scan processing can be performed with detailed scan settings through a user operation on the first setting screen 110. When scan processing is executed by the selected device, scanned data created by the scan processing is transmitted to the common module 36. The processing that the scanned data is transmitted to the common module 36 and thereafter, that is, the processing in S532 to S538 is the same as the processing in the first embodiment, except that the SDK 200 executes the processing that is executed by the driver 34 in the processing in S132 to S138 (see FIG. 3) of the first embodiment. Thus, the descriptions of those processing will be omitted. In the third embodiment, the SDK 200 and the first application 30 may be combined to function as one application. Alternatively, the SDK 200, the first application 30, and the common module 36 may be combined to function as one application. In this case, the first application may be referred to as "module".

The CPU 12 that executes S128, S225, S226, S528 is one example of transmission means. The CPU 12 that executes S116, S214, S516 is one example of determination means. The CPU 12 that executes S118, S216, S518 is one example of output means and third output means. The CPU 12 that executes S126, S525 is one example of first output means. The CPU 12 that executes S224 is one example of second output means. The CPU 12 that executes S132, S532 is one example of reception means. The CPU 12 that executes S134, S534 is one example of fourth output means. The CPU 12 that executes S136, S536 is one example of fifth output means. The CPU 12 that executes S138, S538 is one example of first display control means. The CPU 12 that executes S120 is one example of second display control means. The CPU 12 that executes S520 is one example of sixth output means. The CPU 12 that executes S521 is one example of third display control means.

According to the above-described embodiments, the following effects are obtained.

In the above-described embodiments, in response to receiving a scan instruction including a setting parameter from the driver 34, the common module 36 transmits, to the selected device, the instruction command including the setting parameter that is included in the scan instruction. In response to receiving a scan instruction including a setting mode from the second application 32, the common module 36 converts the setting mode included in the scan instruction into the parameter corresponding to the setting mode, and transmits an instruction command including the parameter to the selected device. In this way, the scan instruction is transmitted to the selected device through the common module 36 in this way, thereby appropriately performing scan processing based on detailed scan settings and scan processing based on simplified scan settings.

According to the above-described embodiments, for example, it is possible to appropriately perform scan processing in accordance with the parameter indicative of the setting value for detailed settings and perform scan processing in accordance with one option selected from options for rough settings. That is, it is possible to appropriately perform scan processing with detailed scan settings and perform scan processing with simplified scan settings. Thus, scan processing with various scan settings can be performed appropriately.

In the first embodiment, the common module 36 determines whether the common module 36 has started up in response to an instruction from the driver 34 or the second application 32. In a case where the common module 36 has started up in response to the instruction from the driver 34, the common module 36 outputs the capability information of the selected device to the driver 34. Then, the driver 34 displays the first setting screen 110 corresponding to the capability information, thereby setting a parameter for each setting item of scan settings within a range corresponding to the capability value of the selected device. In a case where the common module 36 has started up in response to the instruction from the second application 32, the common module 36 outputs the mode information to the second application 32. Then, the second application 32 displays the second setting screen 120 corresponding to the mode information, thereby performing simplified scan settings of selecting one option from two options of the document mode and the photograph mode.

In the second embodiment, the common module 36 outputs the mode information and the capability information of the selected device to the second application 32 and the driver 34, without determining whether the common module 36 has started up in response to the instruction from the driver 34 or the second application 32. Then, the driver 34 displays the first setting screen 110 based on the capability information, and the second application 32 displays the second setting screen 120 based on the mode information. Thus, although the common module 36 does not perform determination of the application program, the driver 34 displays the first setting screen 110 and the second application 32 displays the second setting screen 120.

In the first embodiment, the common module 36 converts the setting mode into parameters based on the capability information of the selected device. Specifically, in a case where the selected device is configured to change the setting value for each of four setting items, the common module 36 converts the setting mode into the parameter set for each of the four setting items. In a case where the selected device is configured to change the setting value for each of two setting items, the common module 36 converts the setting mode into the parameter set for each of the two setting items. Thus, scan processing depending on the selected device can be appropriately performed.

In the first embodiment and the second embodiment, the first application 30 performs communication with the common module 36 through the driver 34, and the first setting screen 110 is displayed by the processing of the driver 34. Thus, the first setting screen 110 can be displayed appropriately.

In the third embodiment, the first application 30 performs communication with the common module 36 through the SDK 200. The first setting screen 110 is created by the processing of the SDK 200, and the first setting screen 110 is displayed by the processing of the first application 30. In this case, too, the first setting screen 110 can be displayed appropriately.

While the disclosure has been described in detail with reference to the above aspects thereof, it would be apparent to those skilled in the art that various changes and modifications may be made therein without departing from the scope of the claims.

For example, in the above-described embodiments, the common module 36 that is common to the second application 32 and the driver 34 is provided. That is, each of the second application 32 and the driver 34 is configured to communicate with one common module 36.

Alternatively, as shown in FIG. 2B, a common module (the common module 36a and the common modules 36b, 36c) may be individually provided for each of the second application 32 and the drivers 34a, 34b. In this modification, too, processing can be performed appropriately by each common module 36a, 36b, 36c.

In this modification, each of the common module 36a corresponding to the second application 32 and the common modules 36b, 36c corresponding to the drivers 34a, 34b is configured to transmit an instruction command to the same scanner 50, 52. Thus, each scanner 50, 52 can perform both scan processing including scan processing based on the detailed scan settings and scan processing based on the simplified scan settings.

In the above-described embodiments, when the setting mode is converted into parameters depending on the capability information of the selected device, the setting mode is converted into parameters depending on the number of setting items. Alternatively, the setting mode may be converted into parameters depending on the range of the setting value. For example, in a case where the selected device is a high-specification device, the setting mode may be converted into parameters of high setting values, and in a case where the selected device is a low-specification device, the setting mode may be converted into parameters of low setting values.

In the above-described embodiments, the four setting items indicative of color tone including "Brightness", "Contrast", "Shadow", and "Gamma" are adopted. Alternatively, another setting item indicative of color tone, for example, "Highlight" may be adopted.

Figure 3:
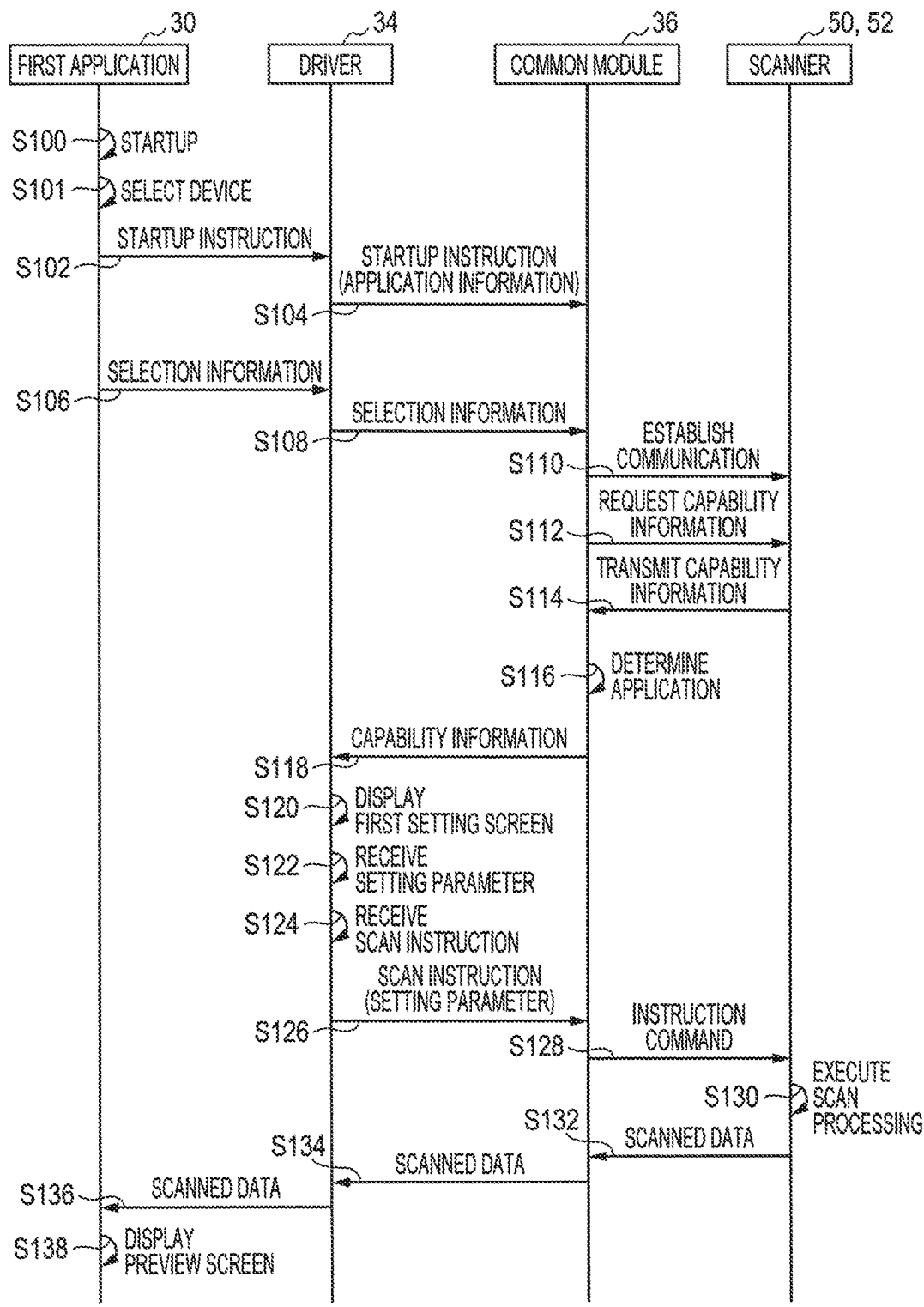
FIG. 3 shows an operational sequence of the scan system 1 in a case where scan processing is executed by using the first application 30.
Figure 4:
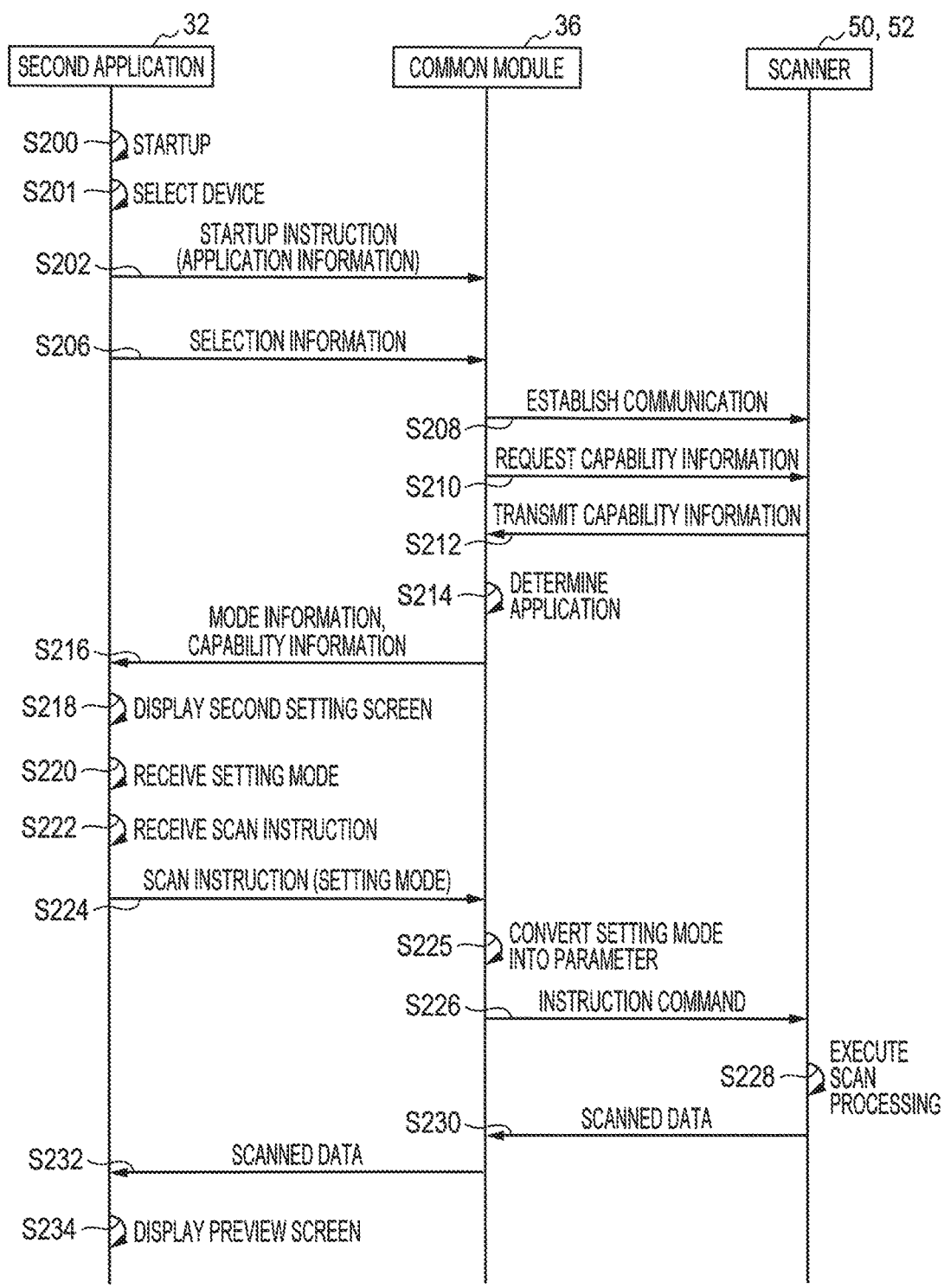
FIG. 4 shows an operational sequence of the scan system 1 in a case where scan processing is executed by using the second application 32.

In the above-described embodiments, the processing shown in FIGS. 3, 4, and 9 is executed by the CPU 12. Alternatively, this processing may be executed by an ASIC or other logic integrated circuits other than the CPU 12, or may be executed by a CPU, an ASIC, or other logic integrated circuits which work in cooperation with one another.

What is claimed is:

1. A non-transitory computer-readable recording medium storing a program including computer-readable instructions for an information processing apparatus, the computer-readable instructions, when executed by a processor of the information processing apparatus, causing the information processing apparatus to perform:
    receiving a first parameter from a first other program different from the program;
    in response to receiving the first parameter from the first other program, transmitting a scan execution command including the first parameter to a scanner through a communication interface of the information processing apparatus, the first parameter being indicative of a setting value that is set for executing scan processing on the scanner;
    receiving mode selection information from a second other program different from the program and from the first other program, the mode selection information being indicative of a mode that is selected from among a plurality of modes for executing scan processing; and
    in response to receiving the mode selection information from the second other program, converting the received mode selection information into a second parameter, and transmitting a scan execution command including the second parameter to the scanner through the communication interface.

2. The non-transitory computer-readable recording medium according to claim 1, wherein the program is configured to be started up based on an instruction from one of the first other program and the second other program;
    wherein the computer-readable instructions, when executed by the processor, cause the information processing apparatus to perform:
        determining whether the program is started up based on an instruction from the first other program or based on an instruction from the second other program;
        in response to determining that the program is started up based on the instruction from the first other program, outputting capability information to the first other program, the capability information including a range of a setting value that is set depending on a capability value of the scanner; and
        in response to determining that the program is started up based on the instruction from the second other program, outputting mode information to the second other program, the mode information including the plurality of modes, wherein the first parameter received from the first other program is a setting parameter selected from the range of the setting value.

3. The non-transitory computer-readable recording medium according to claim 1, wherein the computer-readable instructions, when executed by the processor, cause the information processing apparatus to perform:
    outputting capability information and mode information to one of the first other program and the second other program, the capability information including a range of a setting value that is set depending on a capability value of the scanner, the mode information including the plurality of modes;
    in response to outputting the capability information and the mode information to the first other program, receiving, from the first other program, the first parameter selected from the range of the setting value, and transmitting the scan execution command including the first parameter to the scanner through the communication interface; and
    in response to outputting the capability information and the mode information to the second other program, receiving the mode selection information from the second other program, converting the received mode selection information into the second parameter, and transmitting the scan execution command including the second parameter to the scanner through the communication interface.

4. The non-transitory computer-readable recording medium according to claim 1, wherein the computer-readable instructions, when executed by the processor, cause the information processing apparatus to perform:
    in response to receiving the mode selection information from the second other program, converting the received mode selection information into the second parameter that is set depending on a capability value of the scanner, and transmitting the scan execution command including the second parameter to the scanner through the communication interface.

5. The non-transitory computer-readable recording medium according to claim 1, wherein each of the first parameter and the second parameter is a numerical value of each of a plurality of setting items indicative of scan conditions; and
    wherein each of the plurality of modes collectively identifies parameters of the plurality of setting items.

6. The non-transitory computer-readable recording medium according to claim 1, wherein the computer-readable instructions, when executed by the processor, cause the information processing apparatus to perform:
    receiving, from the first other program, the first parameter and one non-color-tone option in a plurality of non-color-tone options, the first parameter being indicative of color tone, the plurality of non-color-tone options being options other than color tone;
    in response to receiving the first parameter and the one non-color-tone option from the first other program, transmitting the scan execution command to the scanner through the communication interface, the scan execution command including the first parameter and the one non-color-tone option;
    receiving, from the second other program, the mode selection information in the plurality of modes and one non-color-tone option in a plurality of non-color-tone options; and
    in response to receiving the mode selection information and the one non-color-tone option from the second other program, converting the received mode selection information into the second parameter, and transmitting the scan execution command to the scanner through the communication interface, the scan execution command including the second parameter and the one non-color-tone option, the second parameter being indicative of color tone.

7. A non-transitory computer-readable recording medium storing a program group including a common program, a first other program different from the common program, and a second other program different from the common program and from the first other program, the program group including computer-readable instructions for an information processing apparatus, the computer-readable instructions, when executed by a processor of the information processing apparatus, causing the information processing apparatus to perform:

outputting a first parameter from the first other program to the common program, the first parameter being indicative of a setting value that is set for executing scan processing; outputting mode selection information from the second other program to the common program, the mode selection information being indicative of a mode that is selected from among a plurality of modes for executing scan processing;

in response to outputting the first parameter from the first other program to the common program, transmitting a scan execution command including the first parameter from the common program to a scanner through a communication interface of the information processing apparatus; and in response to outputting the mode selection information from the second other program to the common program, converting, by the common program, the mode selection information into a second parameter and transmitting a scan execution command including the second parameter to the scanner through the communication interface.

8. The non-transitory computer-readable recording medium according to claim 7, wherein the common program is configured to be started up based on an instruction from one of the first other program and the second other program;

wherein the computer-readable instructions, when executed by the processor, cause the information processing apparatus to perform:

determining, by the common program, whether the program is started up based on an instruction from the first other program or based on an instruction from the second other program;

in response to determining that the program is started up based on the instruction from the first other program, outputting capability information from the common program to the first other program, the capability information including a range of a setting value that is set depending on a capability value of the scanner;

in response to determining that the program is started up based on the instruction from the second other program, outputting mode information from the common program to the second other program, the mode information including the plurality of modes;

in response to receiving the capability information by the first other program, outputting first parameter from the first other program to the common program, the first parameter being selected from the range of the setting value; and in response to receiving the mode information by the second other program, outputting the mode selection information from the second other program to the common program.

9. The non-transitory computer-readable recording medium according to claim 8, wherein the program group further includes a third other program different from the common program, the first other program, and the second other program;

wherein the computer-readable instructions, when executed by the processor, cause the information processing apparatus to perform:

in response to receiving the capability information by the first other program, controlling, by the first other program, a display of the information processing apparatus to display a setting screen for setting an arbitrary setting value from the range of the setting value through a user operation;

in response to transmitting the scan execution command to the scanner, receiving, by the common program, scanned data from the scanner;

outputting the received scanned data from the common program to the first other program;

in response to receiving the scanned data by the first other program, outputting the scanned data from the first other program to the third other program; and in response to receiving the scanned data by the third other program, controlling, by the third other program, the display to display an image based on the scanned data.

10. The non-transitory computer-readable recording medium according to claim 8, wherein the program group further includes a third other program different from the common program, the first other program, and the second other program;

wherein the computer-readable instructions, when executed by the processor, cause the information processing apparatus to perform:

in response to receiving the capability information by the first other program, outputting image data of a setting screen from the first other program to the third other program, the setting screen being for setting the first parameter in the range of the setting value through a user operation;

in response to receiving the image data of the setting screen by the third other program, controlling, by the third other program, a display of the information processing apparatus to display the setting screen based on the image data;

in response to transmitting the scan execution command to the scanner, receiving, by the common program, scanned data from the scanner;

outputting the received scanned data from the common program to the first other program;

in response to receiving the scanned data by the first other program, outputting the scanned data from the first other program to the third other program; and in response to receiving the scanned data by the third other program, controlling, by the third other program, the display to display an image based on the scanned data.

11. The non-transitory computer-readable recording medium according to claim 8, wherein the computer-readable instructions, when executed by the processor, cause the information processing apparatus to perform:

transmitting a request for the capability information from the common program to the scanner through the communication interface;

receiving, by the common program, the capability information from the scanner through the communication interface; and in response to receiving the capability information, outputting the capability information from the common program to one of the first other program and the second other program.

12. The non-transitory computer-readable recording medium according to claim 8, wherein the computer-readable instructions, when executed by the processor, cause the information processing apparatus to perform:

in response to receiving the capability information by the first other program, controlling, by the first other program, a display of the information processing apparatus to display a first setting screen, the first setting screen including a first object for adjusting a numerical value relating to color tone; and in response to receiving the mode information by the second other program, controlling, by the second other program, the display to display a second setting screen, the second setting screen including a second object for selecting one of the plurality of modes relating to color tone.

13. The non-transitory computer-readable recording medium according to claim 8, wherein the second parameter for each of setting items relating to color tone is set preliminarily for each of the plurality of modes, the second parameter corresponding to each of the plurality of modes being set for each of capability values of the scanner.

14. The non-transitory computer-readable recording medium according to claim 7, wherein the computer-readable instructions, when executed by the processor, cause the information processing apparatus to perform:

in response to outputting the mode selection information from the second other program to the common program, converting, by the common program, the mode selection information into the second parameter depending on a capability value of the scanner and transmitting the scan execution command including the second parameter to the scanner through the communication interface.

15. The non-transitory computer-readable recording medium according to claim 7, wherein the common program includes a first common program and a second common program; and wherein the computer-readable instructions, when executed by the processor, cause the information processing apparatus to perform:

outputting the first parameter from the first other program to the first common program; outputting the mode selection information from the second other program to the second common program;

in response to outputting the first parameter from the first other program to the first common program, transmitting the scan execution command including the first parameter from the first common program to the scanner; and in response to outputting the mode selection information from the second other program to the second common program, converting, by the second common program, the mode selection information into the second parameter and transmitting the scan execution command including the second parameter from the second common program to the scanner.

16. The non-transitory computer-readable recording medium according to claim 15, wherein the scan execution command is transmitted to the same scanner by processing of either the first common program or the second common program.

17. The non-transitory computer-readable recording medium according to claim 7, wherein the computer-readable instructions, when executed by the processor, cause the information processing apparatus to perform:

outputting the first parameter and one non-color-tone option from the first other program to the common program, the first parameter being indicative of color tone, the one non-color-tone option being one of a plurality of non-color-tone options that are options other than color tone; outputting the mode selection information and one non-color-tone option from the second other program to the common program, the mode selection information being indicative of one of the plurality of modes that are modes relating to color tone;

in response to outputting the first parameter and the one non-color-tone option from the first other program to the common program, transmitting the scan execution command from the common program to the scanner through the communication interface, the scan execution command including the first parameter and the one non-color-tone option; and in response to outputting the mode selection information and the one non-color-tone option from the second other program to the common program, converting, by the common program, the mode selection information into second parameter and transmitting the scan execution command to the scanner through the communication interface, the scan execution command including the second parameter and the one non-color-tone option, the second parameter being indicative of color tone.

18. The non-transitory computer-readable recording medium according to claim 17, wherein each of the first parameter and the second parameter includes brightness and contrast of a scanned image.

19. The non-transitory computer-readable recording medium according to claim 7, wherein the plurality of modes includes a document mode for scanning a document and a photograph mode for scanning a photograph.

20. An information processing apparatus comprising:
a communication interface;
an input interface; and
a control device configured to:
receive input of a first parameter through the input interface, the first parameter being indicative of a setting value that is set for executing scan processing;
receive input of mode selection information through the input interface, the mode selection information being indicative of a mode that is selected from among a plurality of modes for executing scan processing;
in response to receiving the first parameter, transmit a scan execution command including the first parameter to a scanner through the communication interface; and
in response to receiving the mode selection information, convert the mode selection information into a second parameter and transmit a scan execution command including the second parameter to the scanner through the communication interface.

* * * * *